UNITED STATES PATENT OFFICE 2,497,904

MODIFIED DRYING OIL

Joseph Nichols, New York, N. Y., assignor to Interchemical Corporation, New York, N. Y., a corporation of Ohio No Drawing. Application May 8, 1947,
Serial No. 746,859

5 Claims. (Cl. 260—398)

This invention relates to the modification of tung oil by treating the oil with acetic anhydride to improve its drying qualities.

Several methods for improving the drying properties of unsaturated fatty acid glyceride oils have been proposed. Among such proposed processes is one which consists in heating the oil to be modified with an oxiding agent such as peroxide or an inorganic chromate or permanganate. A process which has been proposed for treating oiticica oil and po-yoak oil, consists in heating the oil with acetic anhydride at temperatures of 200° to 230° C. This treatment results in an increase in the drying rate of the oil.

I have now discovered that the drying rate of tung oil may be increased by heating the oil at reflux with acetic anhydride and removing the acetic anhydride. The time of heating with acetic anhydride will depend largely on the degree or extent of modification desired, however, I prefer times of about 1 to 4 hours. The ratio of tung oil to acetic anhydride is preferably within the range of 5 to 30 parts by weight of acetic anhydride to 100 parts by weight of tung oil. The process is also applicable to other drying oils such as linseed oil, dehydrated castor oil etc., but the effect on the drying rate is not as pronounced with these other oils as it is with tung oil.

In the process of my invention crude tung oil is refluxed with acetic anhydride in the ratio of 5 to 25 parts by weight acetic anhydride for each 100 parts of tung oil. The reflux temperature of the mixing will depend upon the ratio of tung oil to acetic anhydride, however, it will generally be between 160° and 180° C. Also, as the reaction is continued the reflux temperature may increase slightly. After refluxing the mixture for 1 to 4 hours the unreacted acetic anhydride is removed as by distillation, preferably under reduced pressure and with a small stream of an inert gas such as nitrogen or carbon dioxide passing through the mixture. Although I prefer to remove the acetic anhydride under such non-oxidizing conditions, I may nevertheless distill the acetic anhydride even at atmospheric pressure. I may also remove the acetic anhydride by washing the oil with water. The recovery of acetic anhydride is almost quantitative.

That the product obtained by the above outlined process is different from the raw oil is readily seen by comparing the air-drying times of the two oils. From the table it will be noted that the air-drying time for the oil refluxed with acetic anhydride is roughly about $\frac{1}{12}$ that of the untreated raw oil. Other physical properties of the oil do not appear to be appreciably affected by the treatment with acetic anhydride.

Table

|  | Viscosity in Poises | Refractive Index at 25° C. | Drying Time |
|---|---|---|---|
| Tung Oil | 2.1 | 1.5166 | 6 hours. |
| Acetylated Tung Oil | 2.45 | 1.5160 | 25–35 min. |

The following examples in which the parts are by weight are given to further illustrate the invention.

Example I

To 500 parts of tung oil was added 150 parts of acetic anhydride and the resulting mixture was refluxed for 2 hours. Acetic anhydride was then removed by vacuum distillation at 10 mm. pressure with a small stream of nitrogen gas bubbling through the mixture. The product resulting as a residue dried to a tack-free film in 15 to 20 minutes.

Example II

A mixture consisting of 100 parts of tung oil and 15 parts of acetic anhydride was refluxed for 3 hours at a temperature of about 160° C. Removal of excess acetic anhydride was then effected by vacuum distillation with a small stream of carbon dioxide passing through the mixture. Essentially all of the acetic anhydride was recovered. The tung oil which remained as residue had a viscosity of 2.45 poises and dried to a tack-free film in 25 to 35 minutes. The drying rate of untreated tung oil under similar conditions was about 6 hours.

Example III

A mixture consisting of 100 parts of tung oil and 10 parts of acetic anhydride was refluxed at about 165° C. for 3 hours. Acetic anhydride was then removed by vacuum distillation at about 10 mm. pressure with a small stream of carbon dioxide passing through the mixture. The treated tung oil thus obtained had a viscosity of 3.4 poises and a drying time in air of 20 to 25 minutes.

Tung oil treated by the process of my invention is useful in the preparation of fast drying inks, paints, varnishes, and the like. In addition to possessing improved air drying qualities, these compositions also dry faster under ultra violet light than do compositions made from untreated tung oil.

I claim:
1. A process for improving the drying qualities of tung oil which comprises refluxing the oil with acetic anhydride at 160° to 180° C., and removing the acetic anhydride.
2. A process for improving the drying qualities of tung oil which comprises refluxing the oil with acetic anhydride at 160° to 180° C. and distilling the acetic anhydride under reduced pressure.
3. A process for improving the drying qualities of tung oil which comprises refluxing the oil with acetic anhydride at 160° to 180° C. and removing the acetic anhydride under non-oxidizing conditions.
4. A process for improving the drying qualities of tung oil which comprises refluxing the oil with acetic anhydride at 160° to 180° C. and distilling the acetic anhydride under reduced pressure with the assistance of a non-oxidizing gas.
5. A process for improving the drying qualities of tung oil which comprises refluxing the oil with 5 to 30 per cent of its weight of acetic anhydride at 160° to 180° C. and distilling the acetic anhydride under reduced pressure with the assistance of a non-oxidizing gas.

JOSEPH NICHOLS.

REFERENCES CITED

The following references are of record in the file of this patent:

UNITED STATES PATENTS

| Number | Name | Date |
| --- | --- | --- |
| 2,425,200 | Nessler et al. | Aug. 5, 1947 |